US012777125B2

(12) United States Patent

Shimizu

(10) Patent No.: US 12,777,125 B2

(45) Date of Patent: Oct. 27, 2026

(54) INFORMATION PROCESSING APPARATUS FOR AUTOMATED SIMPLE MAIL TRANSFER PROTOCOL (SMTP) ENCRYPTION SETTING, CONTROL METHOD FOR THE SAME, AND STORAGE MEDIUM

(71) Applicant: CANON KABUSHIKI KAISHA, Tokyo (JP)

(72) Inventor: Shota Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 18/483,006

(22) Filed: Oct. 9, 2023

(65) Prior Publication Data

US 2024/0129420 A1 Apr. 18, 2024

(30) Foreign Application Priority Data

Oct. 17, 2022 (JP) ................................ 2022-166026

(51) Int. Cl.

| | |
|---|---|
| ***H04N 1/44*** | (2006.01) |
| ***H04L 9/40*** | (2022.01) |
| ***H04L 51/10*** | (2022.01) |
| ***H04N 1/00*** | (2006.01) |

(52) U.S. Cl.

CPC ........... *H04N 1/4486* (2013.01); *H04L 51/10* (2013.01); *H04L 63/0428* (2013.01); *H04L 63/166* (2013.01); *H04N 1/00217* (2013.01)

(58) Field of Classification Search

None

See application file for complete search history.

(56) References Cited

U.S. PATENT DOCUMENTS

| | | | | |
|---|---|---|---|---|
| 10,193,844 | B1 * | 1/2019 | Conley | H04L 51/214 |
| 2011/0145563 | A1 * | 6/2011 | Kain | H04L 63/166<br>713/151 |
| 2021/0092102 | A1 * | 3/2021 | Hathaway | H04L 63/168 |

FOREIGN PATENT DOCUMENTS

| | | | |
|---|---|---|---|
| JP | 2004054893 | A | 2/2004 |
| JP | 2012240383 | A | 12/2012 |

OTHER PUBLICATIONS

Bucksch, Ben. "Autoconfiguration in Thunderbird." Bucksch.org, https://www.bucksch.org/1/products/thunderbird/autoconfiguration/.

* cited by examiner

*Primary Examiner* — Miya J Cato

(74) *Attorney, Agent, or Firm* — Canon U.S.A., Inc. IP Division

(57) ABSTRACT

An information processing apparatus having a function of setting a setting value group associated with one type selected from a plurality of types in the information processing apparatus acquires, based on the selected one type, information indicating whether communication with a Simple Mail Transfer Protocol (SMTP) server is established using encryption-related settings for encrypting a communication path with the SMTP server and automatically sets, in a case where the information is information indicating that communication with the SMTP server is established, a setting value for enabling a function of encrypting the communication path with the SMTP server using the encryption-related settings by which communication is established.

12 Claims, 7 Drawing Sheets

300

310

FIG.3C
FIG.3D
320
SETUP WIZARD
CONNECTION CANNOT BE ESTABLISHED IF SMTP SECURITY IS RAISED.
THERE IS A POSSIBILITY THAT SECURITY CAN BE RAISED IF YOU MAKE THE FOLLOWING SETTINGS.
· DATE/TIME SETTING:
· UPDATE OF TLS SETTING AND CERTIFICATE OF MAIL SERVER (CONTACT NETWORK ADMINISTRATOR SEPARATELY)
· UPDATE OF CA CERTIFICATE OF THIS MACHINE (PERFORM PROCESSING IN WEB SETTING SCREEN OF THIS MACHINE)
OK
SKIP
330
SETUP WIZARD
ALTHOUGH HIGH SECURITY LEVEL IS SELECTED, CONNECTION TO MAIL SERVER BY PREDEFINED SETTINGS HAS FAILED, AND THEREFORE THE FOLLOWINGS ARE SET.
· TLS SETTING FOR SMTP: ON
· TLS CERTIFICATE EXPIRATION DATE CONFIRMATION: OFF
· ALGORITHM AVAILABLE BY TLS CERTIFICATE: SHA256/SHA384
OK

INFORMATION PROCESSING APPARATUS FOR AUTOMATED SIMPLE MAIL TRANSFER PROTOCOL (SMTP) ENCRYPTION SETTING, CONTROL METHOD FOR THE SAME, AND STORAGE MEDIUM

BACKGROUND

Field

The present disclosure relates to security settings for communication in an information processing apparatus having a communication function.

Description of the Related Art

In an information processing apparatus having a communication function, it is desirable to perform appropriate setting between a client and a server in order to enhance security in communication, where the communication fails if appropriate setting is not performed.

A multifunction peripheral (MFP), which is an example of the information processing apparatus, is configured so that security settings for communication from higher security to lower security can be flexibly made to enable installation in various use environments. The number of setting items is large, and thus it is difficult to perform appropriate setting after understanding all the setting items.

As a method of appropriately performing setting related to communication of an MFP, Japanese Patent Application Laid-Open No. 2012-240383 discusses a method that determines whether the current state is an initial installation state at the time of network connection, confirms the network connection if the current state is not the initial installation state, and prompts a user to perform resetting in a case where the connection has failed.

In Japanese Patent Application Laid-Open No. 2012-240383, a case where a user individually sets a communication protocol and subsequently performs setting related to security for the set communication protocol is not considered. In such a case, there is a possibility that communication using this communication protocol is disabled by the setting related to security to be performed later.

SUMMARY

According to an aspect of the present disclosure, an information processing apparatus having a function of setting a setting value group associated with one type selected from a plurality of types in the information processing apparatus comprises a memory storing a program and a processor, that when executing the program, causes the information processing apparatus to acquire, based on the selected one type, information indicating whether communication with a Simple Mail Transfer Protocol (SMTP) server is established using encryption-related settings for encrypting a communication path with the SMTP server, and automatically set, in a case where the information is information indicating that communication with the SMTP server is established, a setting value for enabling a function of encrypting the communication path with the SMTP server using the encryption-related settings by which communication is established.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. The following exemplary embodiments do not limit the present disclosure according to the scope of claims, and not all of combinations of features described in the exemplary embodiments are necessarily required for a solution of the present disclosure.

A first exemplary embodiment according to the present disclosure will be described.

Figure 1:
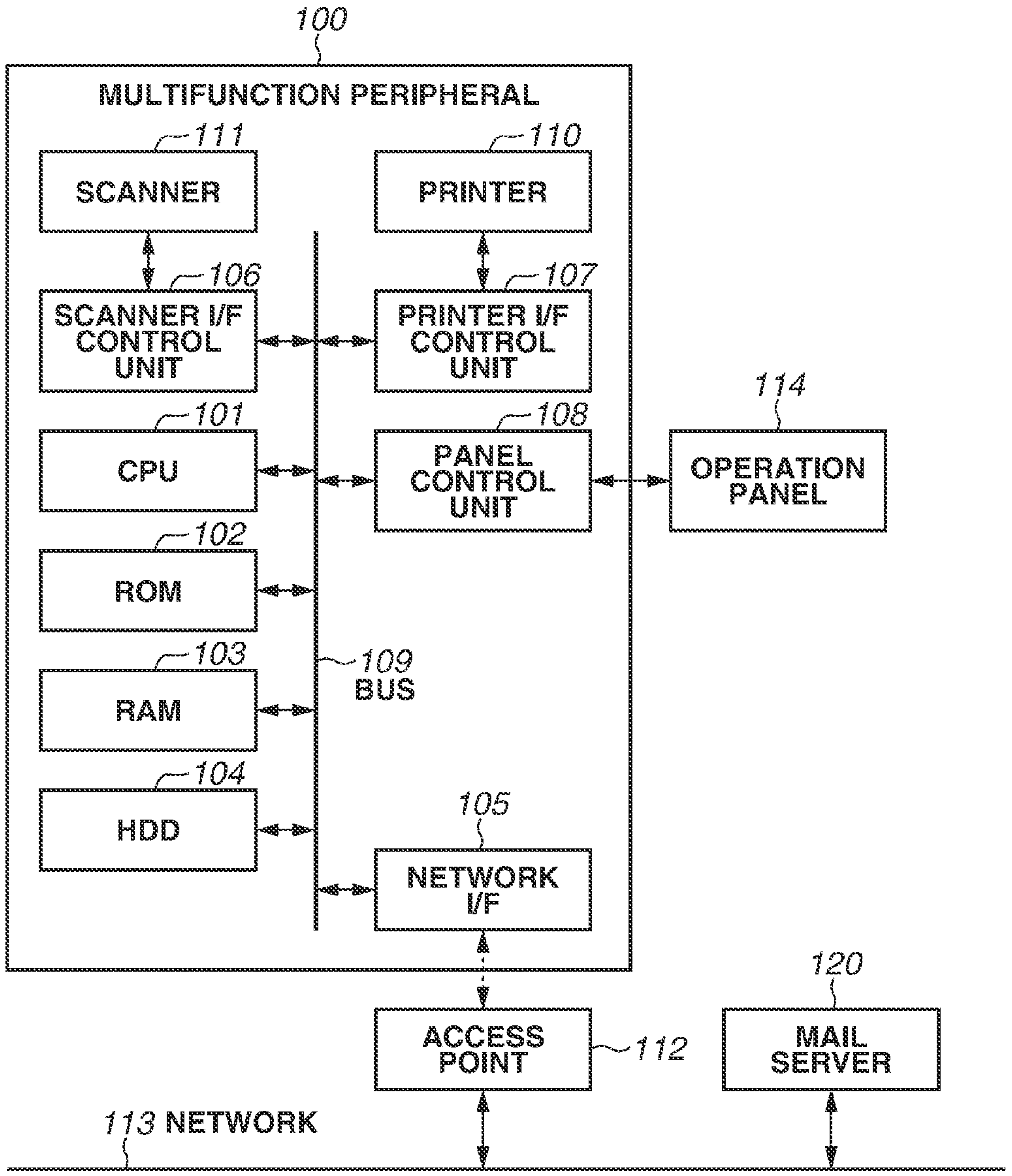
FIG. 1 is a diagram illustrating a hardware configuration of a communication system and a multifunction peripheral according to an exemplary embodiment.

FIG. 1 is a block diagram illustrating a hardware configuration of a communication system and a multifunction peripheral 100 in the present exemplary embodiment. The multifunction peripheral 100 is an image processing apparatus that is an example of an information processing apparatus in the present disclosure. Other than the multifunction peripheral 100, a single-function printer, a scanner, a personal computer (PC), or the like having a communication function may be used.

A central processing unit (CPU) 101 executes a software program of the multifunction peripheral 100, and controls the entire apparatus. A read only memory (ROM) 102 stores a boot program that is a program to be directly read and executed by the CPU 101 first when the multifunction peripheral 100 is turned on.

A random access memory (RAM) 103 is used as storage such as storage of a program and temporary data, when the CPU 101 controls the multifunction peripheral 100. A hard disk drive (HDD) 104 stores a program to be read into the RAM 103 by the boot program, and executed by the CPU 101. The HDD 104 is also used to store data desirable for processing of the multifunction peripheral 100.

A scanner interface (I/F) control unit 106 performs control for reading of an original document by a scanner 111. A printer OF control unit 107 controls processing such as print processing by a printer 110. A panel control unit 108 controls an operation panel 114 of a touch panel type, and controls display of various kinds of information and input of instructions from a user. The multifunction peripheral 100 has a function of transmitting a file including image data obtained by scan by the scanner 111 to an external apparatus by mail. The multifunction peripheral 100 accepts designation of a destination for a mail from the user via the operation panel 114. This mail is transmitted to the destination designated by the user via a mail server 120 to be described below.

A bus 109 interconnects the CPU 101, the ROM 102, the RAM 103, the HDD 104, a network OF 105, the scanner OF control unit 106, the printer OF control unit 107, and the panel control unit 108. Control signals from the CPU 101 and data signals between the devices are transmitted and received via the bus 109.

The network OF 105 connects to an access point 112 by a wireless local area network (LAN), and controls transmission and reception of data exchanged with an external apparatus to and from a network 113 via the access point 112. The network connection to the network 113 is not necessarily the wireless LAN connection via the access point 112, and the network OF 105 may directly connect to the network 113 by a wired LAN.

The mail server 120 is a server for mail transmission, and upon receiving a mail from other apparatus by Simple Mail Transfer Protocol (SMTP) via the network 113, the mail server 120 transmits the received mail to other mail reception server. For example, in the present system, the multifunction peripheral 100 can transmit a mail including a scanned image read by the scanner 111 to the mail server 120 via the network OF 105, using SMTP. The mail server 120 receives this mail by SMTP.

Figure 2:
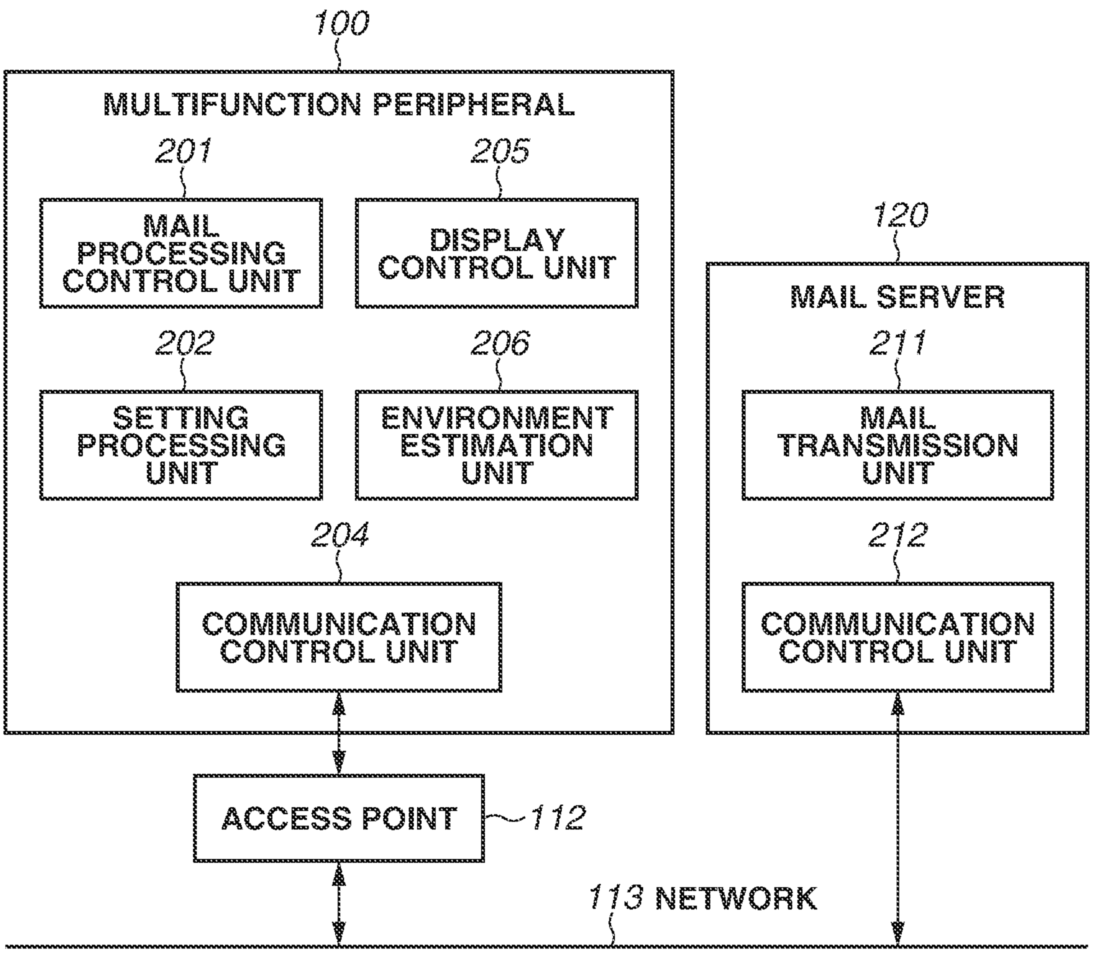
FIG. 2 is a diagram illustrating a software configuration of the multifunction peripheral and a mail server.

FIG. 2 is a diagram illustrating a software configuration of the multifunction peripheral 100 and the mail server 120. All the software programs of the multifunction peripheral 100 are read into the RAM 103 from the ROM 102 and executed by the CPU 101, and the description thereof will be hereinafter omitted.

A communication control unit 204 of the multifunction peripheral 100 connects to the access point 112 using the network OF 105 via the wireless LAN, thereby connecting to the network 113.

A setting processing unit 202 is a software program that performs setting change processing of the multifunction peripheral 100. Upon receiving a setting change instruction from the user via the operation panel 114 or the network OF 105, the setting processing unit 202 stores a setting input by the user in the HDD 104. Other software programs each perform processing for reading a setting value from the HDD 104, using the setting processing unit 202.

A mail processing control unit 201 receives a mail transmission instruction from the user via the operation panel 114, scans an original document using the scanner OF control unit 106 based on this instruction, converts data obtained by the scan into an image, and stores the image in the RAM 103. The mail processing control unit 201 transmits an image stored in the RAM 103 to the mail server 120 via the network 113 by SMTP, using the communication control unit 204.

A display control unit 205 performs processing for displaying a screen corresponding to the processing of each function on the operation panel 114, using the panel control unit 108.

An environment estimation unit 206 performs processing for estimating a use environment from information communicated by the communication control unit 204 and setting information stored in the HDD 104, and changing settings to settings suitable for the use environment in cooperation with the setting processing unit 202. A specific method of estimating an environment will be described in a second exemplary embodiment.

A communication control unit 212 of the mail server 120 transmits and receives data to and from an external apparatus via the network 113. A mail transmission unit 211 receives a mail by SMTP via the network 113, and transmits the received mail to other mail reception server, based on the destination of the mail.

Setting related to the present disclosure at the time of the initial installation of the multifunction peripheral 100 will be described. FIGS. 3A to 3D each illustrate an example of a setup wizard screen displayed at the time of the initial installation of the multifunction peripheral 100. The setup wizard performs setting for using basic functions of the multifunction peripheral 100, such as setting for network, setting for FAX, and setting for mail transmission. A screen 300 is an example of a screen displayed by the display control unit 205 on the operation panel 114, for input of setting information to be used by the mail processing control unit 201 in mail transmission by SMTP. When the user presses an OK button in the screen 300 displayed on the operation panel 114 after inputting an SMTP server name, an SMTP port number, and a sender address, the display control unit 205 detects the user operation and transmits the input information to the setting processing unit 202. The setting processing unit 202 stores the accepted information in the HDD 104, as settings to be applied to the multifunction peripheral 100. In a case where a cancel button is pressed in the screen 300, the display control unit 205 detects this press of the cancel button, and changes the displayed screen of the operation panel 114 to another setting screen in which information is already input. In a case where a skip button is pressed in the screen 300, the display control unit 205 detects this press of the skip button, and changes the displayed screen of the operation panel 114 to the next setting screen.

The screen 300 exemplifies a setting screen for enabling SMTP as a communication protocol to be used in the multifunction peripheral 100. However, the communication protocol is not limited to SMTP, and a setting screen related to other communication protocol may be displayed. For example, a setting screen related to a network authentication method to be used in the wireless LAN may be displayed. In this setting screen, the network authentication method to be used in the wireless LAN can be selected. Examples of the authentication method include Wi-Fi Protected Access 2/WPA-Pre-Shared Key (WPA2/WPA-PSK) and WPA2/WPA-Extensible Authentication Protocol (WPA2/WPA-EAP).

A screen 310 is an example of a security level setting screen for collectively making security-related settings of the multifunction peripheral 100. Table 1 is an example of setting information to be set in the multifunction peripheral 100 based on a security level selected in the screen 310 by the user. A setting value group in each of the second to sixth columns in Table 1 are managed in association with the corresponding security level and stored in the HDD 104. When detecting a user operation of selecting a security level via the screen 310, the display control unit 205 transmits information indicating the selected security level to the setting processing unit 202. The setting processing unit 202 receives this information, and stores the setting value group managed in association with the selected security level in the HDD 104, as setting values to be applied to the multifunction peripheral 100. In the present exemplary embodiment, while the configuration in which the user selects the security level to perform collective setting is described, the security level is an example of an item indicating a use environment of the multifunction peripheral 100. As will be also described in the second exemplary embodiment, for example, a configuration in which the user selects one environment from use-environment options, such as an intranet environment and a home environment, may be adopted.

TABLE 1

| Setting Information Corresponding to Security Level | | | | | |
|---|---|---|---|---|---|
| | Setting related to encryption of SMTP | | | WPA2/ | |
| Security level | TLS setting | TLS certificate expiration date confirmation | Algorithm available by TLS certificate | WPA-EAP encryption method | DNS over TLS |
| Low | OFF | OFF | SHA-1/SHA-256/ SHA-384 | TKIP/AES | Automatic |
| Medium | ON | OFF | SHA-256/SHA-384 | AES | Automatic |
| High | ON | ON | SHA-256/SHA-384 | AES | ON |

The setting item of each column in Table 1 will be described. The second to fourth columns are settings related to encryption of SMTP. Transport Layer Security (TLS) is a mechanism for encrypting communication and performing the encrypted communication. When the TLS setting is changed to ON, data can be transmitted and received upon encryption by TLS, in communication using a predetermined communication protocol. SMTP is used as the predetermined communication protocol. TLS setting for SMTP is an item for setting whether to encrypt SMTP using TLS for communication at the time of mail transmission, and ON is higher in security. In the encryption by TLS, when a client (the multifunction peripheral 100 in the present exemplary embodiment) transmits a TLS connection request to a server (the mail server 120 in the present exemplary embodiment), the server that has received this request transmits a server certificate to the client. The client verifies the received server certificate. The third and fourth columns in Table 1 are setting items related to this server certificate. TLS certificate expiration date confirmation is an item for confirming whether a server certificate transmitted from a server to be a partner in communication by TLS has expired, and setting whether to determine a communication error in a case where the server certificate is confirmed to have expired, and ON is higher in security. A setting for algorithm available by TLS certificate is an item for setting which algorithm is to be permitted as a hash algorithm of a server certificate transmitted by TLS.

As the setting information, Secure Hash Algorithm (SHA)-1, SHA-256, and SHA-384 are included so that any of these can be selected to be used, and SHA-256 and SHA-384 are settings higher in security than SHA-1.

WPA2/WPA-EAP encryption method is an item for setting which encryption method is to be permitted in a case where WPA2/WPA-EAP is selected in setting of the network authentication method to be used in the wireless LAN. Temporal Key Integrity Protocol (TKIP) and Advanced Encryption Standard (AES) are each used as the encryption method. AES is higher in security than TKIP.

Domain Name System (DNS) over TLS is an item for setting whether to perform encryption using TLS when name resolution is performed by DNS in communication via a network. In a case where "automatic" is selected in this setting, communication is performed by TLS if a server of DNS supports TLS, and communication is performed by plaintext otherwise. In this setting, ON is higher in security.

It is desirable to set all of these setting items to higher security, but communication can fail if setting is not appropriately performed beforehand in both of the multifunction peripheral 100 and a communication destination. For example, in a case where TLS is to be used in SMTP, it is desirable to set TLS to ON and to set an appropriate server certificate in an SMTP server (the mail server 120 in the present exemplary embodiment), in advance preparation. A communication error occurs when TLS connection to an unprepared server is attempted. In the multifunction peripheral 100 as well, if a certification authority (CA) certificate to be paired with the server certificate installed in the SMTP server is not installed beforehand, a communication error occurs because the certificate cannot not be appropriately verified.

A communication error can occur if the above-described appropriate setting is not performed beforehand, and if the security level is raised in the screen 310 although communication is possible if nothing is performed after settings for SMTP are made in the screen 300, communication can fail.

This issue can be addressed if the security level setting in the screen 310 is prevented for the items set in the screen 300. In this case, however, security-related settings have to be made individually, and thus a new issue of a decrease in convenience arises. For example, if the TLS setting for SMTP is excluded from targets for setting based on the security level, the connection issue of communication failure is prevented, but a user is required to make the settings individually.

Figure 4:
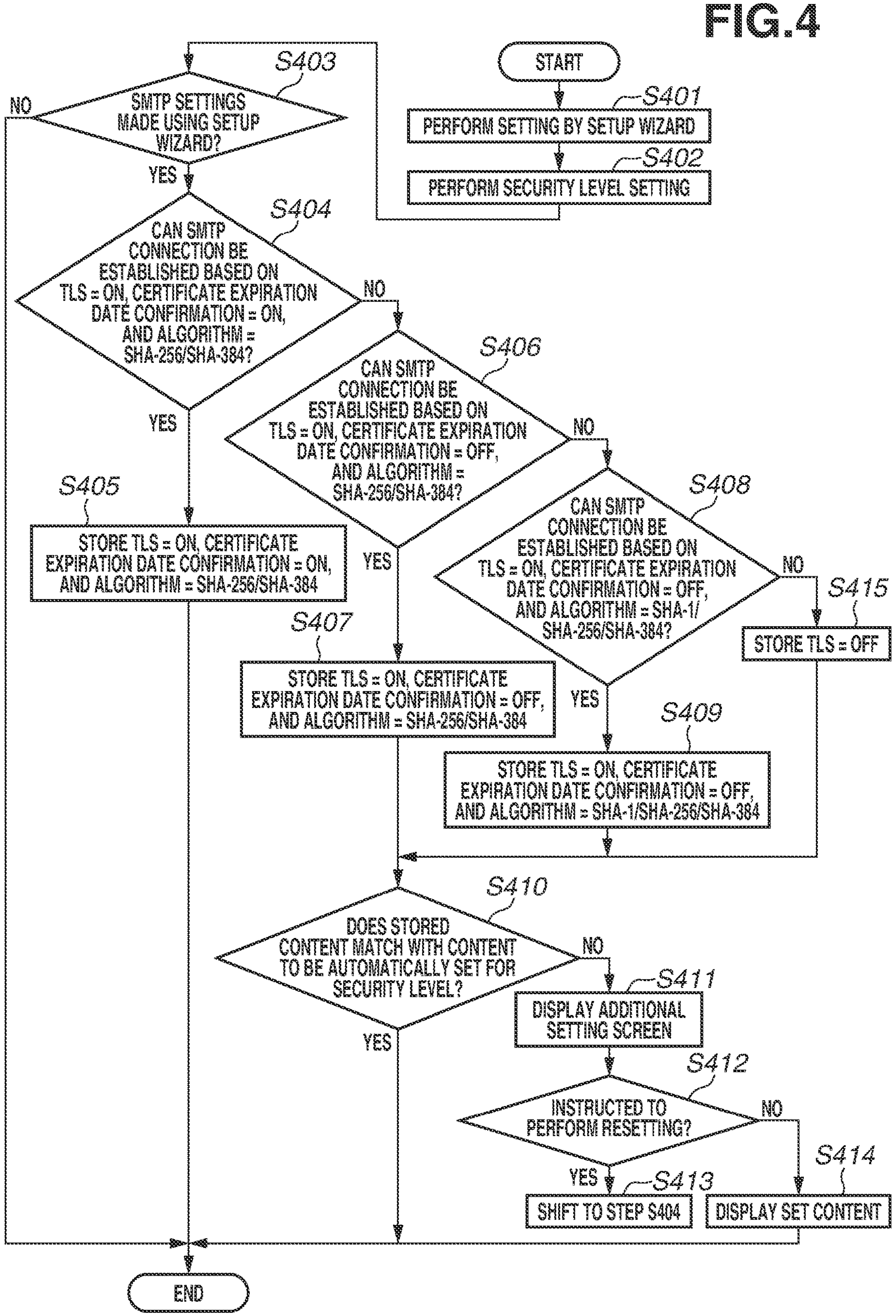
FIG. 4 is a flowchart illustrating processing performed according to a first exemplary embodiment.

A method for addressing this issue will be described with reference to a flowchart in FIG. 4.

When the multifunction peripheral 100 is turned on, the setting processing unit 202 determines whether information indicating that setting by the setup wizard is completed is stored in the HDD 104, and the process in step S401 begins in a case where the information is not stored. In other words, this flow begins in a case where setting by the setup wizard in step S401 has not yet been performed.

Figure 3A:
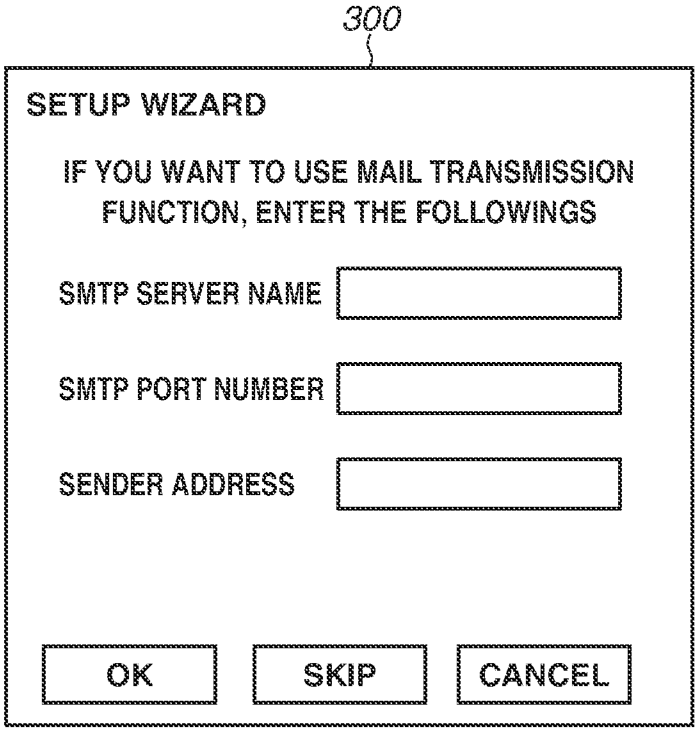
FIGS. 3A to 3D illustrate examples of a screen displayed on an operation panel.
Figure 3B:
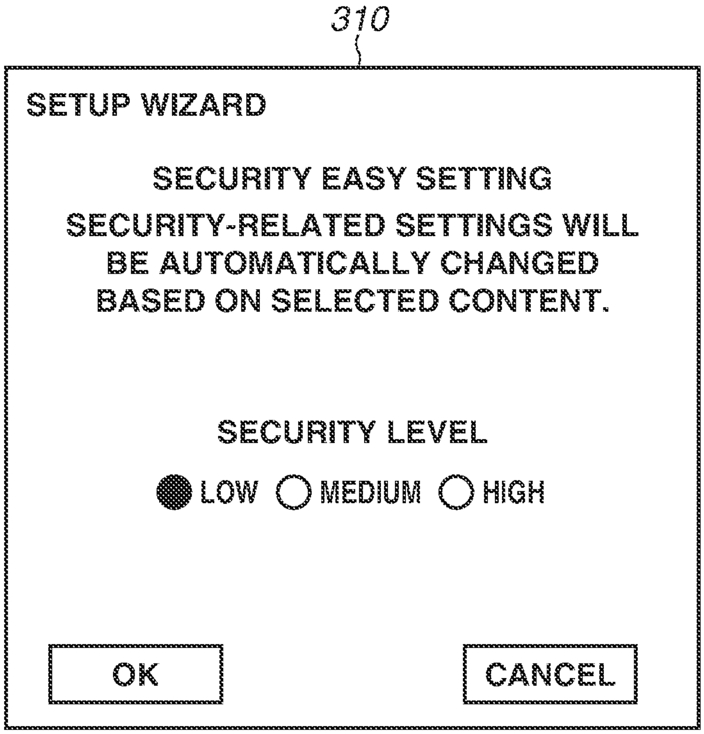

In step S401, the display control unit 205 displays various setting screens of the setup wizard on the operation panel 114. The setting processing unit 202 records setting information input in the operation panel 114, in the HDD 104. The setup wizard displays a setting screen related to each of FAX function, sheet settings, power saving function, network, mail, and security. The screen 300 illustrated in FIG. 3A is an example of such a screen. The display control unit 205 detects user inputs via the screen 300, and transmits input information to the setting processing unit 202. The setting processing unit 202 records setting values to be applied to the multifunction peripheral 100 in the HDD 104, based on the accepted information.

In step S402, the display control unit 205 displays the screen 310 for security level setting, as the last screen of the setting screens of the setup wizard. The display control unit 205 accepts selection of a security level from the user on the operation panel 114. The display control unit 205 transmits information indicating the security level selected by the user to the setting processing unit 202. The setting processing unit 202 changes the setting using the setting value group stored in the HDD 104 in association with the selected security level, based on the information indicating the received security level. The setting processing unit 202 stores the setting values after the change as setting values to be applied to the multifunction peripheral 100, in the HDD 104. The setting processing unit 202 stores information indicating that setting by the setup wizard is completed, in the HDD 104.

In step S403, the setting processing unit 202 determines whether SMTP settings have been made in the process in step S401. In a case where values for SMTP settings stored in the HDD 104 remain as initial values, and setting values such as an SMTP server name are not stored, the setting processing unit 202 determines that the SMTP settings have not been made (NO in step S401), and the processing ends. In a case where values for SMTP settings stored in the HDD 104 are not the initial values, and settings desirable for communication using SMTP such as an SMTP server name are made, the setting processing unit 202 determines that SMTP settings have been made (YES in step S401), and the processing proceeds to step S404. An instruction as to whether to enable communication using SMTP may also be accepted from the user when setting by the setup wizard is performed in step S401, and information indicating the accepted instruction may be stored in the HDD 104, and subsequently, the setting processing unit 202 may perform the determination in step S403 by referring to this information.

In the exemplary embodiments of the present disclosure, a process for the user to individually make settings for the TLS setting for SMTP, the certificate expiration confirmation, and the setting related to available algorithm is not performed, during the period after the SMTP settings are made in step S401 and before shifting to the process in step S404. For example, in the present exemplary embodiment, the user gives an instruction to perform collective setting including these settings, but the user does not individually designate setting values for the respective setting items. In and after step S404, the user does not make these settings individually, and the multifunction peripheral 100 automatically performs connection confirmation and setting.

In step S404, the setting processing unit 202 issues an instruction to perform connection confirmation to the mail processing control unit 201. Upon receiving the instruction, the mail processing control unit 201 attempts to determine whether communication is established, by operating on the assumption that TLS setting for SMTP is ON, that TLS certificate expiration date confirmation is ON, and that algorithm available by TLS certificate is SHA-256/SHA-384. The mail processing control unit 201 performs connection confirmation by SMTP, with respect to the mail server 120 via the communication control unit 204, using the above-described TLS setting, certificate expiration date confirmation, and setting related to available algorithm. Upon completing the connection confirmation, the mail processing control unit 201 notifies the setting processing unit 202 of the result. In a case where the setting processing unit 202 is notified of a result indicating successful connection (YES in step S404), the processing proceeds to step S405. In step S405, the setting processing unit 202 stores setting values indicating that TLS setting for SMTP is ON, TLS certificate expiration date confirmation is ON, and algorithm available by TLS certificate is SHA-256/SHA-384, in the HDD 104, as setting values to be applied to the multifunction peripheral 100.

In a case where the setting processing unit 202 is notified of a result indicating unsuccessful connection (NO in step S404), the processing proceeds to step S406. In step S406, the setting processing unit 202 issues an instruction to perform connection confirmation to the mail processing control unit 201. Upon receiving the instruction, the mail processing control unit 201 operates on the assumption that TLS setting for SMTP is ON, that TLS certificate expiration date confirmation is OFF, and that algorithm available by TLS certificate is SHA-256/SHA-384. Encryption settings to be used are prepared to be at least partially different from the settings used in step S404. The mail processing control unit 201 retries connection confirmation by SMTP with respect to the mail server 120 via the communication control unit 204, using the settings different from the settings in step S404. Upon completing the connection confirmation, the mail processing control unit 201 notifies the setting processing unit 202 of the result. In a case where the setting processing unit 202 is notified of a result indicating successful connection (YES in step S406), the processing proceeds to step S407. In step S407, the setting processing unit 202 stores settings indicating that TLS setting for SMTP is ON, that TLS certificate expiration date confirmation is OFF, and that algorithm available by TLS certificate is SHA-256/SHA-384, in the HDD 104.

In a case where the setting processing unit 202 is notified of a result indicating unsuccessful connection (NO in step S406), the processing proceeds to step S408. In step S408, the setting processing unit 202 issues an instruction to perform connection confirmation to the mail processing control unit 201. Upon receiving the instruction, the mail processing control unit 201 operates on the assumption that TLS setting for SMTP is ON, that TLS certificate expiration date confirmation is OFF, and that algorithm available by TLS certificate is SHA-1/SHA-256/SHA-384. In a manner similar to step S404 and step S406, the mail processing control unit 201 performs connection confirmation by SMTP with respect to the mail server 120 via the communication control unit 204. Upon completing the connection confirmation, the mail processing control unit 201 notifies the setting processing unit 202 of the result. In a case where the setting processing unit 202 is notified of a result indicating successful connection (YES in step S408), the processing proceeds to step S409. In step S409, the setting processing unit 202 stores settings indicating that TLS setting for SMTP is ON, that TLS certificate expiration date confirmation is OFF, and that algorithm available by TLS certificate is SHA-1/SHA-256/SHA-384 in the HDD 104, and the processing proceeds to step S410. In a case where the setting processing unit 202 is notified of a result indicating unsuccessful connection (NO in step S408), the processing proceeds to step 415. In step S415, the setting processing unit 202 stores a setting indicating that TLS setting for SMTP is OFF in the HDD 104, and the processing proceeds to step S410.

Figure 3C:
Figure 3D:

In step S410, the setting processing unit 202 determines whether the content stored in the HDD 104 matches with the content set for the security level in step S402. For example, in a case where the process in step S410 is performed after the process in step S407 in a state where the high security level is selected, the setting processing unit 202 determines that the stored content does not match with the content in Table 1 (NO in step S410), and the processing proceeds to step S411. In step S411, the setting processing unit 202 displays an additional setting screen on the operation panel 114. A screen 320 in FIG. 3C is an example of the additional setting screen. Because connection using the highest security setting related to TLS has failed in step S404, the user is advised to make a date setting and to update the CA recertification, as settings of the multifunction peripheral 100 desirable for correction of this situation. The user is also advised to confirm the setting of the mail server with which the multifunction peripheral 100 is to communicate. When the press of an OK button by the user in the screen 320 is detected, the setting processing unit 202 determines that an instruction to perform resetting is provided (YES in step S412), and the processing proceeds to step S413 to shift to step S404. When the press of a skip button by the user in the screen 320 is detected, the setting processing unit 202 determines that an instruction to perform resetting is not provided (NO in step S412), and the processing proceeds to step S414. In step S414, the setting processing unit 202 displays the set content on the operation panel 114. A screen 330 in FIG. 3D is an example of a display screen when the process in step S414 is performed after the process in step S407. In a case where the process in step S414 is performed after the process in step S409, the corresponding content is displayed. In a case where the process in step S414 is performed after the process in step S415, information indicating that the TLS setting is changed to OFF is displayed.

Another example will be described. In a case where the process in step S410 is performed after the process in step S407 in a state where the medium security level is selected in step S402, the setting processing unit 202 determines that the content in Table 1 and the content stored in the HDD 104 match each other (YES in step S410), and the processing ends.

According to the exemplary embodiment described above, the setting change is performed using the result of the connection confirmation in step S404 to step 408, and therefore, the setting highest in security intensity among the settings that enable connection can be automatically made without individual setting instructions from the user.

In the present exemplary embodiment, the case where TLS is used in SMTP has been mainly described. However, in a case where there are security-related settings for other communication protocols, convenience and security can be improved by performing similar processing. For example, in a case where WPA2/WPA-EAP is selected in the wireless LAN setting by the setup wizard in step S401, connection confirmation is performed by AES, and in a case where the connection fails, processing for performing connection confirmation by the AES/TKIP setting is performed. In the case of DNS over TLS, connection confirmation may be performed in order of ON, automatic, and OFF, and the setting processing unit 202 may store the settings at the time of successful connection in the HDD 104.

The case where the connection confirmation in step S404 to step S408 is performed in a case where the settings for SMTP, WPA2/WPA-EAP, DNS, and the like are enabled has been described so far. In the exemplary embodiments of the present disclosure, the connection confirmation in step S404 to step S408 is not performed in a case where the settings for SMTP, WPA2/WPA-EAP, DNS, and the like are not enabled. This makes it possible to perform connection confirmation and setting using encryption settings, only for a protocol for which setting is enabled, and to prevent connection confirmation for a protocol for which setting is not enabled and encryption settings are unnecessary.

In the present exemplary embodiment, the flow in which the processes in and after step S404 are performed after the step for accepting the selection of the security level by the user via the screen 310 as in step S402 has been described. However, a flow in which the processes in and after step S404 are performed without a user instruction equivalent to the instruction in step S402 may be adopted. In other words, a flow in which upon acceptance of an input related to the SMTP setting from the user via the screen 300, the connection confirmation in and after step S404 is automatically performed and settings by which connection is established are applied to the multifunction peripheral 100 may be adopted. In this flow, the processes in step S410 to step S414 are not performed.

Alternatively, a part of the flow in and after step S404 may be omitted based on the selection by the user in step S402, after step S402 is performed. Specifically, when the selection of the "high" security level is accepted in step S402, the processing proceeds to step S404 after step S403 is performed, and the setting processing unit 202 performs the subsequent processing. On the other hand, when the selection of the "medium" security level is accepted in step S402, the processing proceeds to step S406 after step S403 is performed, and the setting processing unit 202 performs the subsequent processing. This is based on the setting information corresponding to the "medium" security level in Table 1. At the "medium" security level, the certificate expiration date confirmation may be OFF, and therefore, the connection confirmation in step S404 is skipped and step S406 is performed. When the selection of the "low" security level is accepted in step S402, the processing proceeds to step S415 after step S403 is performed, and the subsequent processing is performed. This is because the TLS setting may be OFF at the "low" security level. This can reduce the number of times the connection confirmation is performed. In a method in which all the connection confirmations are performed from step S404 and settings by which connection is established are applied to the multifunction peripheral 100 regardless of the security level selected in step S402, the number of times the connection confirmation is performed increases, but there is an effect of being able to enhancing security as much as possible. In Table 1, the TLS setting related to SMTP for each of the "medium" security level and the "high" security level is "ON". This is to set "ON" if connection is successful after connection confirmation is performed. However, a setting value of "automatic" may be used in place of "ON". This is because, in the exemplary embodiments of the present disclosure, connection confirmation is automatically performed, and "ON" or "OFF" is automatically set depending on whether connection is established or not.

The second exemplary embodiment according to the present disclosure will be described.

In the first exemplary embodiment, as the method of setting the security level, the method in which the user selects the security level using the operation panel 114 is described. As another method, a method in which the multifunction peripheral 100 estimates a use environment based on communicated information and setting information and automatically makes settings based on the estimated use environment is conceivable.

Table 2 is an example of setting information to be set by the setting processing unit 202, based on a result of processing for estimating a use environment performed by the environment estimation unit 206. Setting items are similar to those in Table 1, and therefore the description of these items will be omitted.

TABLE 2

| Setting Information Corresponding to Use Environment | | | | | |
|---|---|---|---|---|---|
| | Setting related to encryption of SMTP | | | WPA2/ | |
| Use environment | TLS setting | TLS certificate expiration date confirmation | Algorithm available by TLS certificate | WPA-EAP encryption method | DNS over TLS |
| Intranet | ON | ON | SHA-1/SHA-256/ SHA-384 | TKIP/AES | Automatic |
| Internet direct connection | ON | ON | SHA-256/SHA-384 | AES | Automatic |
| Internet prohibition | ON | ON | SHA-256/SHA-384 | AES | ON |
| Home | ON | ON | SHA-256/SHA-384 | TKIP/AES | Automatic |
| Community space | ON | ON | SHA-256/SHA-384 | AES | Automatic |

In the following description, five environments can each be estimated as a use environment, which are “intranet”, “Internet direct connection”, “Internet prohibition”, “home”, and “community space”. In the case of each of the Internet prohibition, the intranet, and the home among these environments, the multifunction peripheral 100 is not open to the public on the Internet, and therefore the multifunction peripheral 100 is less likely to receive an attack such as an authorized access from a malicious assailant. For this reason, a high security setting is not necessarily required. Meanwhile, in the case of the Internet direct connection and the public space, a high security setting is required because the multifunction peripheral 100 is open to an unspecified large number of people. These use environments are merely examples, and a configuration in which other use environment is estimated to make settings may be adopted.

Depending on the environment, high security is not desired, and therefore, the display processes in step S411 and step S414 in the method of the first exemplary embodiment can be annoying for a user, leading to no effect and only reducing convenience. In the present exemplary embodiment, a method to minimize a reduction in the convenience of a user in the multifunction peripheral 100 capable of performing setting based on use environment estimation will be described.

Figure 5A:
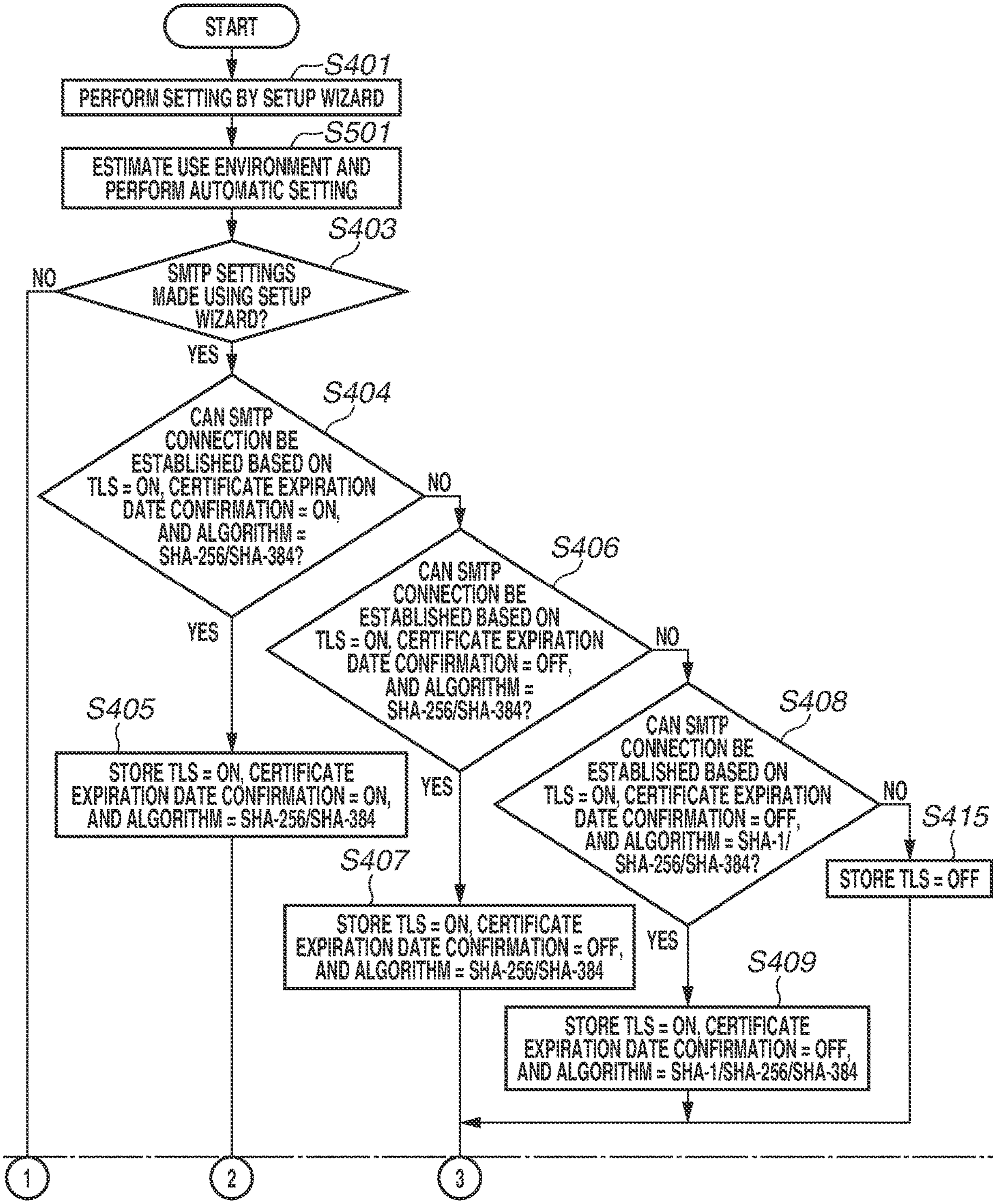
FIGS. 5A and 5B are a flowchart illustrating processing performed according to a second exemplary embodiment.
Figure 5B:
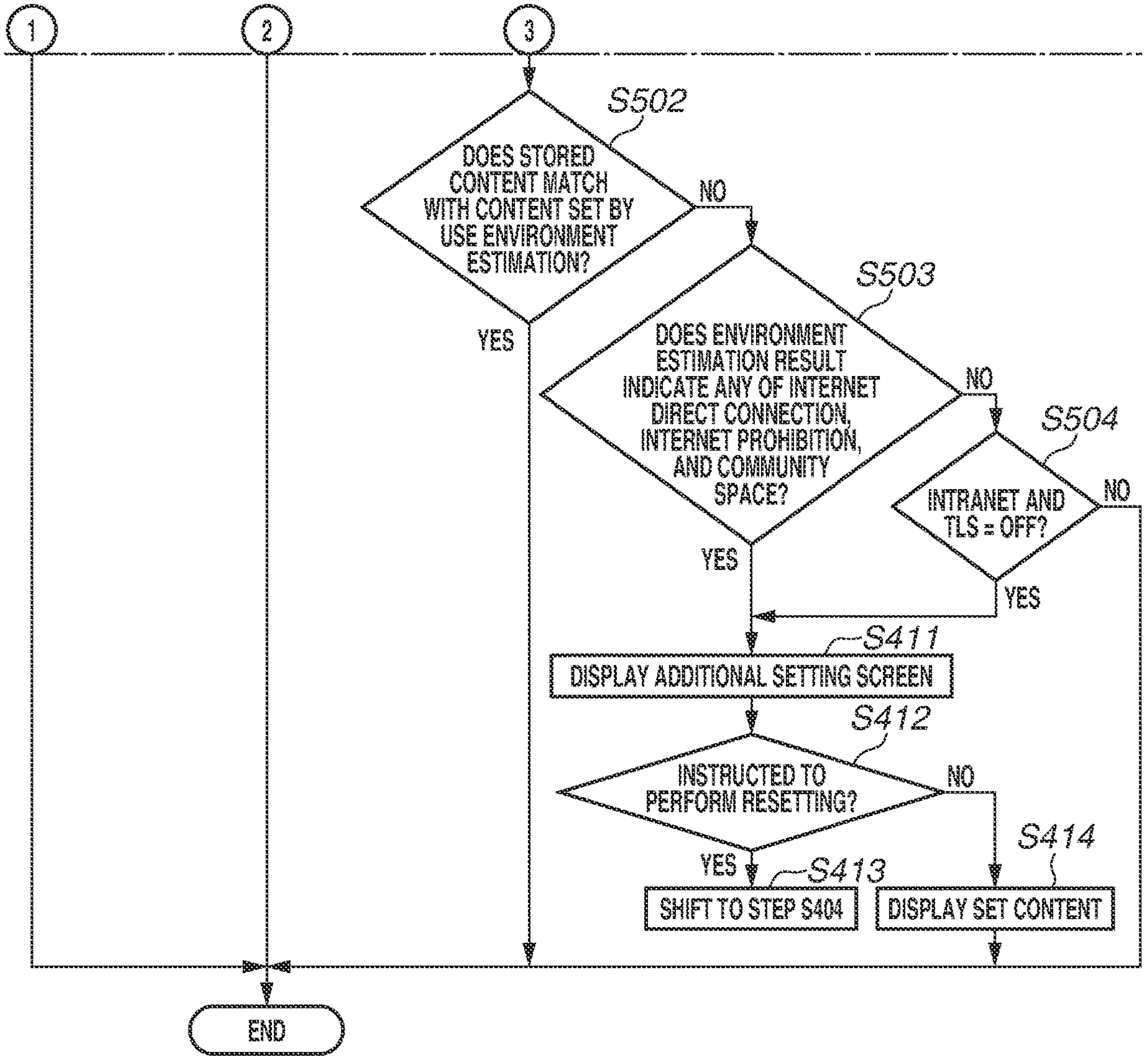

FIGS. 5A and 5B are a flowchart illustrating processing of the second exemplary embodiment. The description of processes similar to those in FIG. 4 will be omitted.

In step S501, after the process in step S401, the environment estimation unit 206 estimates a use environment, based on setting values stored in the HDD 104, and packet transmission/reception by a plurality of communication protocols with respect to the network 113 via the communication control unit 204. For example, in a case where an Internet Protocol version 4 (Ipv4) address is set in the process in step S401, and if this address is a global IP address, the environment estimation unit 206 determines that the use environment is the Internet direct connection environment, and instructs the setting processing unit 202 to store settings based on Table 2 in the HDD 104.

In the estimation of the use environment based on the packet transmission/reception, a traffic amount, the number of destination addresses, the number of transmission source addresses, the number of kinds of protocol, and the like are used. The traffic amount is the number of communication packets transmitted and received per unit time. A device can receive data by connecting to a network, through unicast communication addressed to the device, broadcast with no designated destination, and multicast. The traffic amount of each of the broadcast and the multicast increases in proportion to the number of information devices on a network, and thus is information from which the scale of a network to connect can be estimated. The unicast communication may be excluded to identify the scale of a network more precisely. Which one of a large-scale intranet, a medium-scale community space, and a small-scale home has a relatively high possibility of being the use environment can be estimated, based on the magnitude of the value of the traffic amount. For example, if the value of the traffic amount is large, there is a high possibility that the large-scale intranet having a large number of information devices on a network is the use environment. If the value of the traffic amount is small, there is a high possibility that the small-scale home is the use environment. If the value of the traffic amount is moderate, there is a high possibility that the medium-scale community space is the use environment.

When the setting by the setup wizard is completed, and the estimation of the use environment is completed, the setting processing unit 202 stores information indicating that the setting by the setup wizard is completed in the HDD 104, and the processing proceeds to step S403.

In a case where the setting processing unit 202 has performed the process in step S407 or step S409, or in a case where connection has failed in step S408, the processing proceeds to step S502. In step S502, the setting processing unit 202 determines whether the content stored in the HDD 104 matches with the content set by the use environment estimation in step S501. In a case where the contents match each other (YES in step S502), the processing ends. In a case where the contents do not match each other (NO in step S502), the processing proceeds to step S503. In step S503, the setting processing unit 202 determines whether the result of estimating the use environment in step S501 indicates any of the Internet direct connection, the Internet prohibition, and the community space, and in a case where the result indicates any of these (YES in step S503), the processing proceeds to step S411. In a case where the result indicates none of these (NO in step S503), the processing proceeds to step S504. In step S504, the setting processing unit 202 determines whether the result of estimating the use environment in step S501 indicates the intranet and whether the TLS setting for SMTP stored in the HDD 104 is OFF. In a case where the TLS setting for SMTP is OFF (YES in step S504), the setting processing unit 202 determines that it is desirable to change the TLS setting for SMTP to ON as a minimum setting even if the use environment is the intranet, and the processing proceeds to step S411. In a case where the use environment is the intranet and the TLS setting for SMTP is ON, or in a case where the use environment is estimated to be the home (NO in step S504), the setting processing unit 202 determines that it is not necessary to perform the setting processing any further, and the processing ends.

According to the exemplary embodiment described above, the TLS setting for SMTP can be appropriately made after the use environment is automatically estimated, without selection of the use environment by the user. Besides, because unnecessary screens are not displayed on the operation panel 114 for the user in an environment where high security is not desired, the convenience improves.

In the present exemplary embodiment, the case where no screen is displayed in a case where the use environment is the intranet and the TLS setting is OFF is described. However, this conditional determination may be performed based on another environment estimation result or setting. This is not limited to the settings for SMTP and TLS, and is applicable to the security settings of other communication protocols.

<Other Exemplary Embodiments>

The present disclosure can also be implemented by processing for supplying a program for implementing one or more functions in each of the above-described exemplary embodiments to a system or apparatus via a network or a storage medium and causing one or more processors in a computer of the system or apparatus to read and execute the program. The present disclosure can also be implemented by a circuit (for example, an application specific integrated circuit (ASIC) or a Field Programmable Gate Array (PFGA)) that implements the one or more functions.

According to the information processing apparatus of the present disclosure, setting related to security of a communication protocol can be appropriately performed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2022-166026, filed Oct. 17, 2022, which is hereby incorporated by reference herein in its entirety.

What is claimed is:

1. An information processing apparatus having a function of setting a setting value group associated with one type selected from a plurality of types in the information processing apparatus, the information processing apparatus comprising:

a memory storing a program; and a processor, that when executing the program, causes the information processing apparatus to:

acquire, based on the selected one type, information indicating whether communication with a Simple Mail Transfer Protocol (SMTP) server is established using encryption-related settings for encrypting a communication path with the SMTP server; and automatically set, in a case where the information is information indicating that communication with the SMTP server is established, a setting value for enabling a function of encrypting the communication path with the SMTP server using the encryption-related settings by which communication is established, wherein in a case where the information is information indicating that communication with the SMTP server is not established, the information processing apparatus acquires different information indicating whether communication with the SMTP server is established using different settings from the encryption-related settings for encrypting the communication path with the SMTP server, and wherein in a case where the information is information indicating that communication with the SMTP server is not established and the different information is information indicating that communication with the SMTP server is established, the information processing apparatus automatically sets the setting value for enabling the function of encrypting the communication path with the SMTP server using the different settings.

2. The information processing apparatus according to claim 1, wherein the encryption-related settings used for acquisition of the information have a higher security level than the at different settings.

3. The information processing apparatus according to claim 1, wherein the processor further causes the information processing apparatus to:

store a different setting value group associated with each of a plurality of types, and accept selection of one type from the plurality of types from a user, wherein the different settings used for acquisition of the different information are not included in the setting value group stored in association with the selected one type, and wherein in a case where the setting value for enabling the function of encrypting the communication path with the SMTP server is automatically set using the different settings, a user is notified that the setting value for enabling the function of encrypting the communication path with the SMTP server is set using the at least partially different settings.

4. The information processing apparatus according to claim 3, wherein the user is notified that the setting value for enabling the function of encrypting the communication path with the SMTP server is set using the at different settings on condition that the selected one type is a predetermined type.

5. The information processing apparatus according to claim 1, wherein in a case where the information is information indicating that communication with the SMTP server is established, the setting value for enabling the function of encrypting the communication path with the SMTP server is automatically set using the encryption-related settings by which connection is established without a user instruction for the encryption-related settings.

6. The information processing apparatus according to claim 1, wherein the processor further causes the information processing apparatus to:

store a different setting value group associated with each of a plurality of types, and accept selection of one type from the plurality of types by a user, wherein the encryption-related settings for encrypting the communication path with the SMTP server that are used for acquisition of the information are included in the setting value group stored in association with the selected one type.

7. The information processing apparatus according to claim 1, wherein in a case where the information is information indicating that communication with the SMTP server is not established, the processor causes the information processing apparatus to issue a notification prompting confirmation of a certificate to be used for encryption of the communication path with the SMTP server, wherein the certificate is installed in the information processing apparatus and the SMTP server.

8. The information processing apparatus according to claim 1, wherein the encryption-related settings for encrypting the communication path with the SMTP server are settings for encryption by Transport Layer Security (TLS), in communication with the SMTP server.

9. The information processing apparatus according to claim 1, wherein the information processing apparatus is an image processing apparatus including at least a scanner or a printer.

10. The information processing apparatus according to claim 1, wherein the information processing apparatus includes a scanner, and wherein the information processing apparatus transmits a file including image data obtained by scanning operation by the scanner to the SMTP server using the SMTP.

11. A method for an information processing apparatus having a function of setting a setting value group associated with one type selected from a plurality of types in the information processing apparatus, the method comprising:

acquiring, based on the selected one type, information indicating whether communication with a Simple Mail Transfer Protocol (SMTP) server is established using encryption-related settings for encrypting a communication path with the SMTP server; and automatically setting, in a case where the information is information indicating that communication with the SMTP server is established, a setting value for enabling a function of encrypting the communication path with the SMTP server using the encryption-related settings by which communication is established, wherein in a case where the information is information indicating that communication with the SMTP server is not established, the information processing apparatus acquires different information indicating whether communication with the SMTP server is established using different settings from the encryption-related settings for encrypting the communication path with the SMTP server, and wherein in a case where the information is information indicating that communication with the SMTP server is not established and the different information is information indicating that communication with the SMTP server is established, the information processing apparatus automatically sets the setting value for enabling the function of encrypting the communication path with the SMTP server using the different settings.

12. A non-transitory storage medium that stores a computer program for executing a method for an information processing apparatus having a function of setting a setting value group associated with one type selected from a plurality of types in the information processing apparatus, the method comprising:

acquiring, based on the selected one type, information indicating whether communication with a Simple Mail Transfer Protocol (SMTP) server is established using encryption-related settings for encrypting a communication path with the SMTP server; and automatically setting, in a case where the information is information indicating that communication with the SMTP server is established, a setting value for enabling a function of encrypting the communication path with the SMTP server using the encryption-related settings by which communication is established, wherein in a case where the information is information indicating that communication with the SMTP server is not established, the information processing apparatus acquires different information indicating whether communication with the SMTP server is established using different settings from the encryption-related settings for encrypting the communication path with the SMTP server, and wherein in a case where the information is information indicating that communication with the SMTP server is not established and the different information is information indicating that communication with the SMTP server is established, the information processing apparatus automatically sets the setting value for enabling the function of encrypting the communication path with the SMTP server using the different settings.

* * * * *